Feb. 11, 1941.   L. R. LUDWIG   2,231,674
AUXILIARY TUBE FOR IGNITORS
Filed June 24, 1938

WITNESSES:
E. F. Oberheim.
R. W. Bailey

INVENTOR
Leon R. Ludwig.
BY
S. A. Strickler
ATTORNEY

Patented Feb. 11, 1941

2,231,674

UNITED STATES PATENT OFFICE 2,231,674

AUXILIARY TUBE FOR IGNITORS

Leon R. Ludwig, Wilkinsburg, Pa., assignor to Westinghouse Electric & Manufacturing Company, East Pittsburgh, Pa., a corporation of Pennsylvania Application June 24, 1938, Serial No. 215,549

5 Claims. (Cl. 250—27.5)

My invention relates to control circuits for rectifiers, and especially control circuits utilizing a discharge tube.

An object of my invention is to provide in the control circuit of a rectifier an efficient tube that will stand the high peak current necessary for starting the rectifier and yet will have long life.

Figure 1:
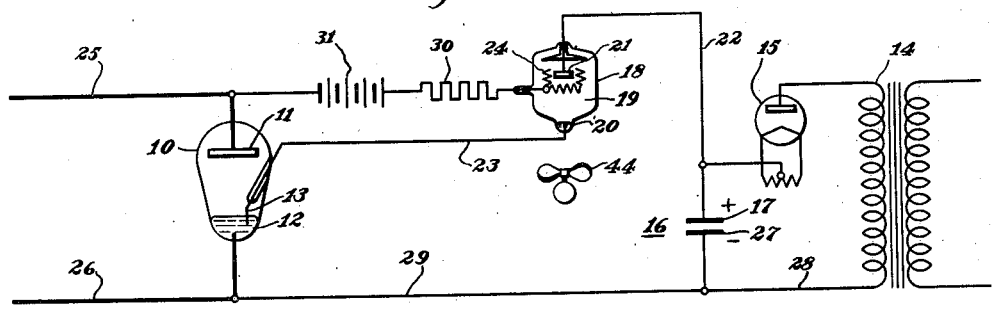
Figure 2:
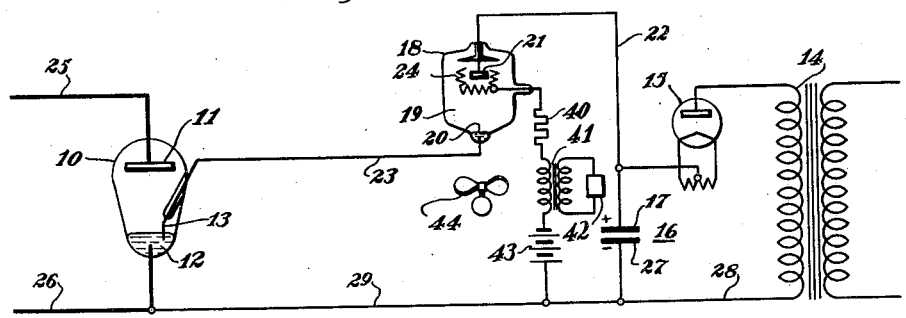

Other objects and advantages of the invention will be apparent from the following description and claims in which:

Figures 1 and 2 are diagrammatic circuits illustrating preferred embodiments of the invention.

While my invention is adapted to be applied to other types of discharge tubes, it has particular reference to the type of rectifier utilizing a mercury pool cathode, an anode and a high resistance material immersed in the mercury pool as a starting electrode. This type of starting electrode has been designated as a make-alive electrode by the art and the theory of its operation, as well as a specific description of the rectifier in which it is generally incorporated, is explained in my joint patent with Joseph Slepian No. 2,069,283, issued February 2, 1937. In the drawing, such rectifier is illustrated at 10 with its anode 11, mercury pool cathode 12 and the high resistance starting electrode 13, preferably of boron carbide, partially immersed in the mercury pool. The reliability of the rectifier 10 to fire when desired during any half cycle or a portion of the half cycle, has made the device readily accepted in the rectifier art. However, the starting current between the starting electrode and the mercury is of the order of 5 to 50 amperes peak current, and consequently there is a difficult problem of providing suitable starting circuits that will efficiently provide this high peak of starting current and yet have long life. It is with this problem of providing this suitable control circuit that my invention has been primarily designed.

In order to provide this high peak of starting current, I preferably provide a source of current to the transformer 14 and insert a rectifier 15, which is preferably of the type illustrated, to charge up an energy storing means such as the condenser 16 to the positive and negative charge illustrated in the drawing. Intermediate the positively charged plate 17 and the condenser 16 and the high resistance starting electrode 13 is inserted a tube 18 in order to control the exact moment of discharge of the charge plate 17 through the starting electrode 13 to the mercury cathode 12. This tube 18 is preferably filled with a gaseous medium 19 of a noble gas which is preferably argon at a pressure of 1 to 20 millimeters of mercury. The cathode is a mercury pool 20. The anode 21 is, of course, connected by conductor 22 to the positive plate 17 of the condenser 16. The cathode 20 of the device 18 is connected by conductor 23 to the starting electrode 13 of the rectifier 10. Within the gaseous discharge device 18, I provide a grid 24 to control the passage of current therethrough. This grid may be of any of the shapes of the prior art and I prefer to have it suitably surround the anode as diagrammatically disclosed in the drawing. The drawing also discloses the supply lines 25 and 26 connected to the anode 11 and cathode 12 of the main discharge device 10. The negative plate 27 of the condenser 16 is connected by conductor 28 to the transformer 14 and also by conductor 29 to the cathode 12 of the main discharge device 10 in order to provide complete circuits for the condenser charging circuit and also for the starting circuit of the main discharge device.

The control of the discharge through the auxiliary tube 18 by the grid 24 may be accomplished in various ways, one of which is illustrated in Fig. 1 and another in Fig. 2. In Fig. 1, the grid 24 is connected through a resistance 30 and a suitable biasing potential 31 to the anode connection 25 to the main rectifier 10. The application of potential to the grid 24 will ensure the discharge through the rectifier 10 until the circuit is interrupted by means of any suitable switch desired.

In Fig. 2, the grid 24 may be connected, if desired, to a resistance 40 and transformer 41 to a suitable timing or interrupting device 42. This device 42 may, for example, be that of an impulse transformer to provide the desired potential to the grid 24 for an instant, or may be any other type of device to provide the grid charge for a longer period. A battery 43 will apply a negative potential to the grid to block the discharge through the tube 18, except for such periods as this blocking charge will be overcome by an application of a positive potential from the device 42.

The gaseous filling 19 of the tube 18 will permit the tube 18 to readily break down to a glow between its cold electrodes 21 and 20, and this glow will immediately change to an arc discharge to the mercury surface 20 of the cathode. Keeping the mercury cathode cool by any suitable cooling means such as the fan 44 will help ensure this breaking of the discharge from a glow to an arc. Inasmuch as the arc discharge will vaporize the liquid mercury and this mercury vapor will condense and return to the pool, the tube will readily withstand the heavy 5 to 50 ampere demand as a peak for starting the discharge through the main discharge tube 10.

While I have disclosed preferred embodiments of my invention, it is apparent that many modifications may be made in the various elements and their combination in the circuit. Accordingly, I desire only such limitations on the following claims as are necessitated by the prior art.

I claim as my invention:

1. In a control circuit for supplying discharge initiating impulses to the make-alive electrode of a vapor-electric device, a glow-arc control device comprising an envelope, a mercury pool cathode in said envelope, an anode cooperating with said cathode and spaced therefrom one to two inches, a filling of argon at a pressure of 1 to 20 millimeters filling the space between said anode and cathode, said argon being slightly contaminated with air and a control grid substantially enclosing said anode for controlling the glow formation.

2. In a control system for supplying control impulses to a vapor electric device, a cold electrode discharge device comprising an unexcited mercury cathode, an anode spaced at a distance of the order of one to two inches from said cathode, a filling of argon in the space between said anode and cathode, said argon having traces of impurities therein so that a glow discharge will form when a potential of the order of three hundred volts is applied across said anode and cathode and a grid substantially enclosing said anode to control the formation of said glow discharge.

3. A glow-arc control device comprising an envelope, a non-excited mercury cathode in said envelope, an anode cooperating with said cathode, an atmosphere of argon in said envelope, traces of impurities in said argon so that a glow discharge will result when a potential of the order of three hundred volts is impressed between said anode and cathode and a control grid substantially enclosing said anode.

4. A cold cathode discharge device comprising a discharge chamber, a mercury cathode in said chamber, an anode spaced from said cathode, a filling of argon in said chamber, said argon containing traces of impurities for controlling the formation of a glow discharge therein and a control grid substantially surrounding said anode.

5. A cold cathode discharge device comprising a discharge chamber, a non-excited mercury cathode in said chamber, an anode spaced from said cathode, an atmosphere of argon at a pressure of the order of one to twenty millimeters of mercury in said chamber, traces of air mixed with said argon for controlling the formation of a glow discharge therein and a control electrode substantially enclosing said anode.

LEON R. LUDWIG.